US011729234B2

(12) United States Patent
Goddard et al.

(10) Patent No.: US 11,729,234 B2
(45) Date of Patent: Aug. 15, 2023

(54) AUGMENTED REALITY POSITIONING AND MATCHING SYSTEM

(71) Applicants: Daniel Goddard, Calabasas, CA (US); Bryton Eric James, West Hollywood, CA (US)

(72) Inventors: Daniel Goddard, Calabasas, CA (US); Bryton Eric James, West Hollywood, CA (US)

( * ) Notice: Subject to any disclaimer, the term of this patent is extended or adjusted under 35 U.S.C. 154(b) by 0 days.

(21) Appl. No.: 18/155,047

(22) Filed: Jan. 16, 2023

(65) Prior Publication Data

US 2023/0156061 A1 May 18, 2023

Related U.S. Application Data

(63) Continuation-in-part of application No. 17/684,301, filed on Mar. 1, 2022, now Pat. No. 11,558,472.

(Continued)

(51) Int. Cl.
*H04L 65/613* (2022.01)
*H04L 67/52* (2022.01)
(Continued)

(52) U.S. Cl.
CPC ......... *H04L 65/613* (2022.05); *G06Q 20/123* (2013.01); *H04L 67/306* (2013.01); *H04L 67/52* (2022.05)

(58) Field of Classification Search
CPC ....... A63F 13/358; A63F 13/69; G05B 15/02; G06F 3/04842; G06F 3/04845; G06F 16/13; G06F 21/10; G06F 21/6245; G06N 20/00; G06Q 10/107; G06Q 20/123; G06Q 20/322; G06Q 50/01; G06T 19/006; H04L 9/0643; H04L 9/50; H04L 12/1818; H04L 51/10; H04L 51/216; H04L 63/105; H04L 63/108; H04L 65/1083; H04L 65/4015; H04L 65/403; H04L 65/613; H04L 65/765; H04L 67/04; H04L 67/131; H04L 67/306;
(Continued)

(56) References Cited

U.S. PATENT DOCUMENTS 8,446,453 B2 * 5/2013 Tian .................... H04L 65/1083 348/14.02
8,621,045 B2 * 12/2013 Chen ....................... H04L 67/04 348/14.02
8,667,162 B2 * 3/2014 Yu ......................... H04L 65/765 709/200
10,310,464 B1 * 6/2019 Lu .......................... G05B 15/02
2009/0315972 A1 * 12/2009 Rensin .............. H04N 21/6181 348/14.02
(Continued)

*Primary Examiner* — Gerald Gauthier
(74) *Attorney, Agent, or Firm* — Cynthia S. Lamon; Lamon Patent Services

(57) ABSTRACT

An audio-visual sharing system has a first user with a mobile platform executing an application and coupled to an Internet network, a second user with a mobile platform executing the application and coupled to the Internet network, an Internet-connected server having a processor executing coded instructions, and coupled to a data repository, a first profile for the first user stored in the data repository; and a second profile for the second user stored in the data repository. The first user is present at an event capturing audio and video of proximate activity and streaming same to the server. The second user is not present at the event, but both the first and second mobile platforms receive an AR board display comprising avatars for the users. The second user is enabled to interact with the first user's avatar to share the audio and video streamed by the first user.

9 Claims, 9 Drawing Sheets

Related U.S. Application Data

(60) Provisional application No. 63/155,284, filed on Mar. 1, 2021.

(51) Int. Cl.
*H04L 67/306* (2022.01)
*G06Q 20/12* (2012.01)

(58) Field of Classification Search
CPC ............... H04L 67/52; H04M 1/72403; H04N 7/148; H04N 21/439; H04N 21/6181; H04W 4/021; H04W 4/16; H04W 4/80
See application file for complete search history.

(56) References Cited

U.S. PATENT DOCUMENTS

| | | | | |
|---|---|---|---|---|
| 2013/0065569 | A1* | 3/2013 | Leipzig | H04W 4/16<br>455/420 |
| 2014/0368601 | A1* | 12/2014 | deCharms | H04N 7/148<br>348/14.02 |
| 2018/0365580 | A1* | 12/2018 | Musuvathi | G06N 20/00 |
| 2019/0311513 | A1* | 10/2019 | Han | H04L 67/131 |
| 2019/0313059 | A1* | 10/2019 | Agarawala | G06T 19/006 |
| 2020/0322649 | A1* | 10/2020 | Melkote Krishnaprasad | H04N 21/439 |
| 2021/0042854 | A1* | 2/2021 | Hazy | G06F 21/6245 |
| 2021/0118085 | A1* | 4/2021 | Bushnell | H04L 9/50 |
| 2022/0103969 | A1* | 3/2022 | Drummond | G06Q 10/107 |
| 2022/0245614 | A1* | 8/2022 | Goddard | H04L 51/10 |
| 2022/0279048 | A1* | 9/2022 | Goddard | G06Q 50/01 |
| 2023/0026917 | A1* | 1/2023 | Frolovichev | H04M 1/72403 |
| 2023/0039077 | A1* | 2/2023 | Pereira | A63F 13/358 |

* cited by examiner

AUGMENTED REALITY POSITIONING AND MATCHING SYSTEM

CROSS-REFERENCE TO RELATED DOCUMENTS

The present application claims priority to co-pending application Ser. No. 17/684,301, filed Mar. 1, 1922, which claims priority to provisional patent application 63/155,284 filed Mar. 1, 2021. All disclosure of the parent documents are incorporated at least by reference.

BACKGROUND OF THE INVENTION

1. Field of the Invention

The present invention is in the technical field of augmented reality (AR) and pertains more particularly to an application enabling users to match with and connect with other users.

2. Description of Related Art

There exist in the art a variety of applications, like, for example, dating applications, which purport to connect users who have common backgrounds and interests, according usually to entered profiles. To the inventor's knowledge, however, there is no application that leverages augmented reality technology in such an application.

BRIEF SUMMARY OF THE INVENTION

In an embodiment of the invention an audio-visual sharing system is provided, comprising a first mobile platform associated specifically with a first user, the first mobile platform having a first imaging apparatus, a first audio microphone and speaker, and first GPS circuitry, executing a mobile application, and coupled to an Internet network streaming an Augmented Reality (AR) display to the first user's mobile platform, a second mobile platform associated specifically with a second user, the second mobile platform having a second imaging apparatus, a second audio microphone and speaker, and second GPS circuitry, executing the mobile application, and coupled to the Internet network streaming the AR display to the second user's mobile platform, an Internet-connected server having a processor executing coded instructions, and coupled to a data repository, a first profile for the first user stored in the data repository, and a second profile for the second user stored in the data repository. The system is characterized in that the first user is present at an event location bounded by GPS coordinates with the first user's mobile platform executing the mobile application and capturing, by the platform's image and microphone devices audio and video of proximate activity, the captured audio and video streamed via the Internet to the Internet-connected server, and in that the second user is not present at the event location, but both the first and second mobile platforms receive an AR board display comprising a first avatar representing the first user as an in-person user present at the event and a second avatar representing the second user as a drop-in user not present at the event. The second user is enabled by functions of the mobile app to interact with the first user's avatar to request permission to receive the audio and video streamed to the Internet-connected server, and the first user is enabled to grant or deny the request, and if granted, the Internet-connected server streams the audio and video to the second user's mobile platform.

In one embodiment the system further comprises a head-mounted imaging device in use by the first user and paired to the first mobile platform, wherein the audio and video is captured by the head-mounted imaging device paired to the first mobile platform, and the first mobile platform streams the audio video to the Internet-connected server. Also, in one embodiment the first and the second user are enabled in the AR display to communicate to negotiate streaming of the audio and video to the second user's mobile platform. In one embodiment a plurality of users present at the event capture and stream audio and video to the Internet-connected server, and the plurality of users cooperate as a unit such that the second user may negotiate from one of the plurality to selectively receive audio and video streamed by individual ones of the plurality of users present at the event. And in one embodiment negotiation of permission to receive the audio video stream comprises agreeing on a price to be paid by the second user to the first user.

In one embodiment the first and the second user's profiles comprise transaction software enabling payment by one user to another. Also, in one embodiment the system further comprises functionality enabling registered users to advertise upcoming events on interactive interfaces and to transact between users for purchasing audio video streams of activity at events. In one embodiment the second user's mobile platform is paired with a flat-screen display and the audio video stream is presented through the flat screen display. And in one embodiment the flat screen display is a smart television.

DETAILED DESCRIPTION OF THE INVENTION

In an embodiment of the invention a system is provided in which augmented reality (AR) matching technology enables a user of the system to be discovered and viewed in AR by other users who are looking to match or have things in common and might like to match & connect. A user may be instantiated in the system as a person, having personal attributes, hashtags, preferences and other profile attributes, or as a Brand. A Brand represents a company and\or product or range of services as a recognized entity. Ben and Jerry's Ice Cream is an example of a Brand that might be an entity represented by a PROFILE POST in an embodiment of the invention. To avoid confusion the specification will refer to and describe Users and Brands separately.

To participate in the Dysko system a user (general term) downloads a specific Dysko mobile application from an App store such as Apple Store™. Personalization and specification are implemented when the user first executes the mobile application on an AR-capable device, such as the user's Smartphone. In that process the user is guided through a process wherein the user may define a user or a Brand. It should be understood that in the circumstance of creating a Brand configuration will be done by an agent of the business or enterprise for which the Brand is being created.

In the Dysko system Augmented Reality (AR) device platforms (smartphones) are used in order to position objects and posts in AR space. Each object/post has also a GPS location. Using the user's device GPS and compass (direction) data an object or post is positioned in an AR display at a correct distance and direction in ARKit/ARCore world coordinates overlaid on a 3D grid that surrounds the user when using camera view when entering AR mode. The object or post size in the display is changed based on the distance from the user. In this way the objects or posts are at the same distance from the user's point of view, while in reality the objects can be near or far away.

Figure 1:
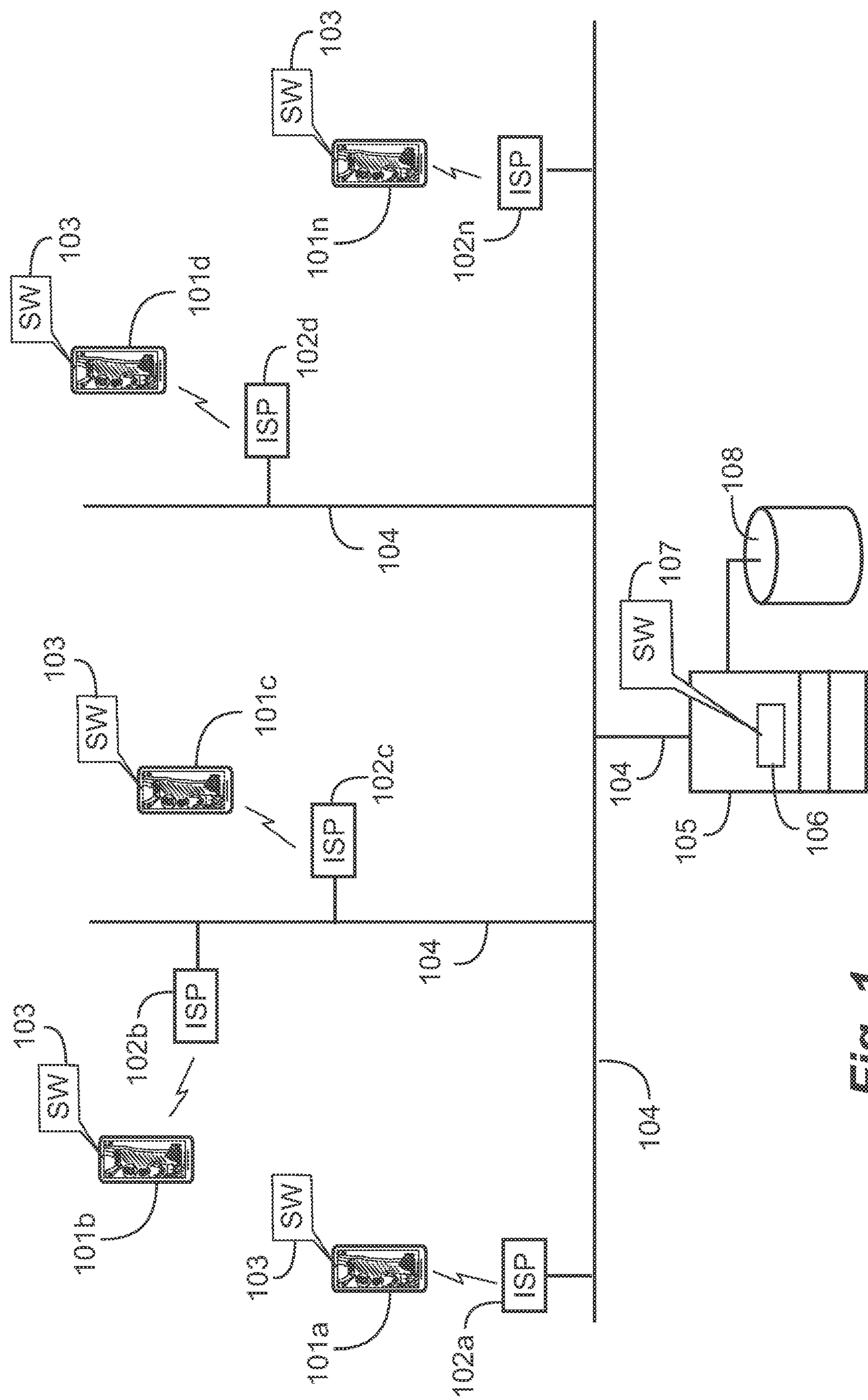
FIG. 1 is an architectural diagram of a system in an embodiment of the present invention.

FIG. 1 is an architectural diagram illustrating the Dysko system in one embodiment of the invention. In this example a plurality of smartphones 101*a* through 101(*n*) are shown, each executing an application 103, which in this example is the mobile application mentioned above. Some of the platforms 101*a* through 101*n* may be Apple devices, and some may be Android, and the platforms will be executing the appropriate mobile application, all designated 103 in FIG. 1, as the user downloads the appropriate application from the App store.

Persons and Brands participating in the Dysko system may be anywhere on Earth, and interaction between smartphones 101(*a-n*) is over the well-known Internet network, indicated in FIG. 1 by Internet backbone 104, which represents all the interconnected networks of the Internet. Each active smartphone, or other mobile device, in practicing the Dysko system connects to the Internet via an Internet Service Provider (ISP) 102(*a-n*). The ISP may be a WiFi modem in a residence or business or may be in some circumstances an ISP operated by a cellular network service in which the mobile device connects over the cellular network then to the Internet. There are a variety of ways that platforms connect to the Internet network, and FIG. 1 is meant to be inclusive. In any case all active mobile devices in FIG. 1 are connected to the Internet.

The Dysko system comprises an Internet-connected server 105 with a central processing unit (CPU) 106 executing software 107. Server 105 is coupled to a digital data repository 108 that in one instance executes a database proprietary to the Dysko system. As persons operating mobile devices 101(*a-n*) interact with one another and with Brands via the Internet. Certain functions are provided to individual ones of the mobile devices by server 105 executing SW 107 and communicating with data repository 108.

As was described above, to practice the Dysko system a user downloads an appropriate version of the Dysko mobile application from an App Store. Upon downloading and initiating the Dysko mobile application the user is directed through a series of configuration steps. The person may be directed in one step to upload a picture of herself or himself. This is preferably a picture that the user snaps using the smartphone's camera in the configuration process in real time. This assures that the picture identifies the person as correctly as possible.

The picture in one embodiment is an element in a profile stored in data repository 108 for the user. In configuring the profile, the user may be guided to enter biographic information, social messages, and importantly, a plurality of hashtags defining interests of the user.

In embodiments of the invention the system creates profile posts for users having profiles, which may be considered avatars representing users, and the profile posts may be provided in AR image data sent to other users and posted in displays on the user's mobile devices. The profile posts and functionality are described in enabling detail further below. The user in this configuration process also must authorize GPS location of his or her mobile device at least while the Dysko mobile application is executing. A user ID may be assigned for each user at configuration and is stored in the database in repository 108.

The Dysko system uses Augmented Reality (AR) device platforms (smartphones) or other Internet-capable platforms in order to position objects/posts in AR space in interactive AR displays provided to the users. Each object/post has a GPS location. Using the user's device GPS and compass data the object/post is positioned at a correct distance and direction in ARKit/ARCore world coordinates overlaid on a 3D grid that surrounds the user when using camera view when entering an AR mode. Since it is desirable to show each object/post at the same size, the object/post size is changed based on distance from the user in a display. This way the objects are at the same distance from the user's point of view, while in reality the objects can be near or far away. The Dysko application processes the device GPS raw data using algorithms like a Low Pass Filter to filter out noises and errors (due to low signal or indoor position) and makes updates to the server only when the updates are known to be relevant. For example, an update may be made if some movement is detected in a preprogrammed time span. The process of location management, update location and search for nearby users is managed by SW 107 (see FIG. 1) in a manner that allows an unlimited number of users to be updated in their location and to receive updates from the database in real-time.

The Dysko app detects that AR posts are moving according to the user's updated location every time the user moves. This data is represented by a new position in the 3D space translated into new 3D coordinates. In addition, the system adjusts the product through the server for different users in different locations, like changing the radius of finding nearest neighbors. For example, a 5 km radius may be used in Los Angeles while a 30 km radius may be used in Colorado.

Figure 2:
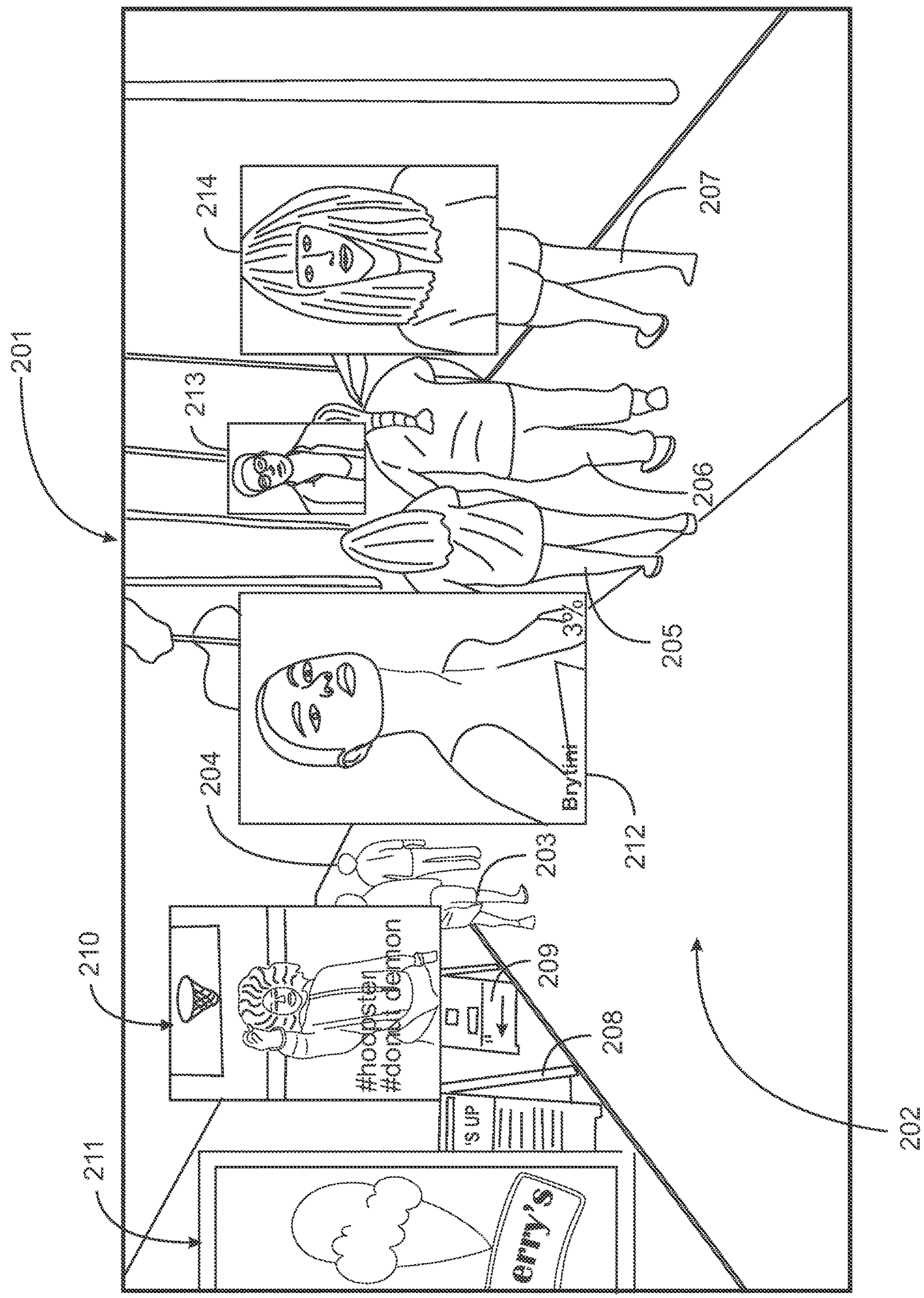
FIG. 2 is a Dysko AR display in an embodiment of the invention.

FIG. 2 is an example of a Dysko AR profile board 201 associated with a user, shown as displayed in AR on the display of the platform of that user, denoted here as "User Uno" for purposes of this description. Background 202 of profile board 201 is video data collected by the imaging device of the user's platform, which is transmitted via the Internet to server 105 (FIG. 1) and processed by AR software (part of SW 107) to prepare an AR display transmitted back to the platform of User Uno and displayed as profile board 201. The video background shows a walkway toward a vanishing point with objects and persons captured in the video. Five people 203, 204, 205, 206 and 207 are seen walking away from the platform capturing video data. There are two signs 208 and 209 seen on one side of the walkway, and some miscellaneous articles, like tree trunks, not annotated in the figure.

Also seen in FIG. 2 are five profile posts, four of these being 210, 212, 213 and 214 associated with other users and one Brand profile post 211 for Ben and Jerry's Ice Cream. Profile post 210 represents a user Aaron who has hashtags #hoopster and #donut demon.

The Dysko system in real time allows a user to (a) be seen or connected with by other users or Brands, or (b) to be shown to be at a specific GPS location on such as Google or Apple maps. The first user located thusly may then be discovered and seen by other users. The profile posts, which may have characteristics of avatars for the associated users, are displayed in board 201 for User Uno, retrieved from data repository 108 by SW107 in the preparation of the AR display to be updated to User Uno and are selected and added to the AR image data according to a range of criteria, described in enabling detail below. In one embodiment the user associated with the profile board 201 may be enabled to swipe up on specific profile posts to remove those posts from the profile board display.

As described above, an important goal of the Dysko system is to enable users to match with and interact with other users and Brands. A basic mechanism for matching in the Dysko system is hashtags. Hashtags are well-known words or phrases preceded by a # symbol. In the configuration process the user is guided to populate his or her profile, stored in data repository 108 (FIG. 1) with hashtags that describe interests of that user, such as, for example #coffeelover, #theatergoer, #dance demon, and so on. Similarly, a Brand populates the Brand profile stored in data repository 108 with hashtags that describe the products and services of the Brand. Ben and Jerry's Ice Cream might use hashtags like #BenAndJerrys #IceCream #Dessert #BaskinRobbins #ColdStone, and so on. A Brand member differs from a personal user in that the Brand is required to purchase advertising space.

When Dysko's users are in those areas that are designated by a Brand and have hashtags in their Dysko profile that match the Brand's tags, (as listed above) then that Dysko user will see Ben & Jerry's profile post in AR. Users are enabled to touch the B&J AR profile post and enter the Brand's profile where they will be able to see, menus, promotions, discounts, make purchases, and so forth.

In regard to other users, User Uno is guided in the configuration process to enter preferences for matching with other users, such as an age range, gender, education level and other, in addition to the hashtags. The system updates User Uno's Dysko profile board 201 in AR by determining which, if any, other users and Brands are in the space of User Uno's real time imaging and platform, and also match with hashtags and display preferences in User Uno's profile. In the instant display of Dysko profile board 201 five users/Brands meet the criteria, and their profile posts 210, 211, 212, 213 and 214 are thus displayed in the AR display data updated to User Uno's platform and posted in spatial relationship to User Uno's platform. Brytni 212 appears to be closest.

It should be understood that the users whose profile posts are displayed in User Uno's Dysko profile board 201 may also be actively following with their own platforms, with ASR profiles displayed.

In some embodiments of the invention methods other than hashtags may be used for matching. For example, User A may match with user B because they have both connected 3rd party apps such as Twitter, Facebook, Zillow and ESPN, and so on. Users may also match in some embodiment by API information granted information within each connected app. For example, user A may match with User B because they both tweet about the same things. In some embodiments a user can enter their 23 & ME account information in their profile enabling Dysko users to see their genetic match percentage with other users. In alternative embodiments there are a substantial number of criteria that may be used for matching. The system may be programmed to declare a match dependent on matching applications on user's devices, for example user A and user B may have a threshold number of social media applications installed and operable on their respective devices, and a match may be made by this circumstance. The actual apps a user subscribes to may be used to infer that a user is male (ESPN and other Sports apps=male or Martha Stewart TV=female). User's may have an overlap in political preferences inferred by active apps (Move On, Green Peace, Etsy).

Figure 3B:
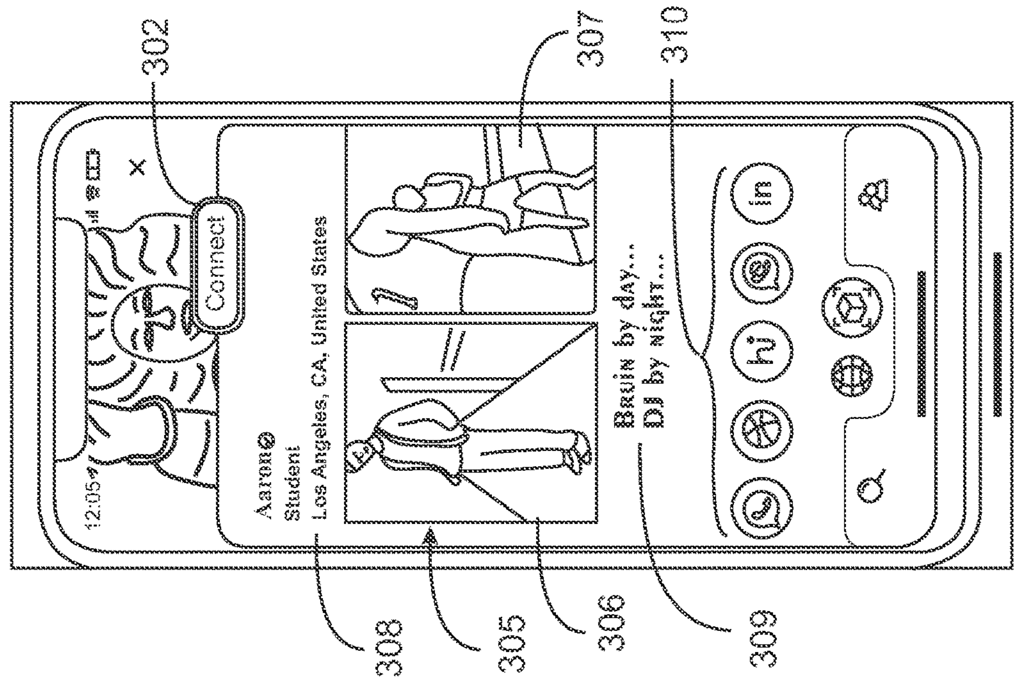
FIG. 3B illustrates an actual profile for the user associated with the profile post of FIG. 3A.
Figure 3A:
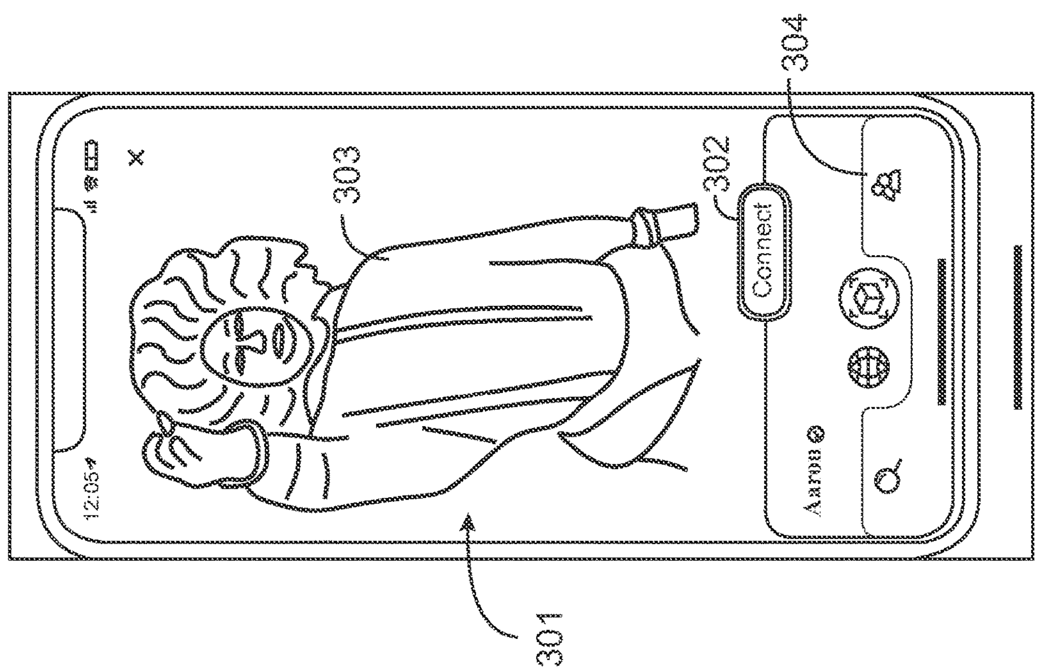
FIG. 3A illustrates a profile post for a user in an embodiment of the invention.

As described above, an important goal of embodiments of the invention is to enable interaction and transaction between users and Brands. In one circumstance connection may be accomplished by Use Uno touching Aaron's profile post 210, and a signal of the fact of selection to server 105 results in SW 107 returning an interactive interface 301 illustrated in FIG. 3A. A "Connect" link 302 on interface 301, if selected, sends a signal to server 105 to open a video call to Aaron's mobile device through execution of SW 107. Interactive interface 301 in FIG. 3A shows the profile photograph 303 that Aaron provided in configuration.

User Uno may select the Connect link at this point, and open a video call to Aaron, but in some circumstances may prefer to know more about Aaron before opening a direct communication. In this circumstance User Uno might access Aaron's profile from interface 301 by selecting people icon 304, which signals server 105 to provide Aaron's profile 305 as illustrated in FIG. 3B. Aaron's profile provides User Uno with considerably more information about Aaron. For example, it displays additional photos 306 and 307 that Aaron provided in configuration, and location information 308. Additional personal information 309 is displayed indicating that Aaron is a Bruin, that is a student at UCLA, by day, and works as a DJ at night.

Profile 305 may also include videos and icons 310 indicating Aaron's favorite media accounts and websites. The additional information provided by viewing Aaron's profile may confirm or reverse a preference by User Uno to contact Aaron, and if positive, the Connect link 302 is provided at the upper right of the profile enabling initiation of a video call.

Figure 4B:
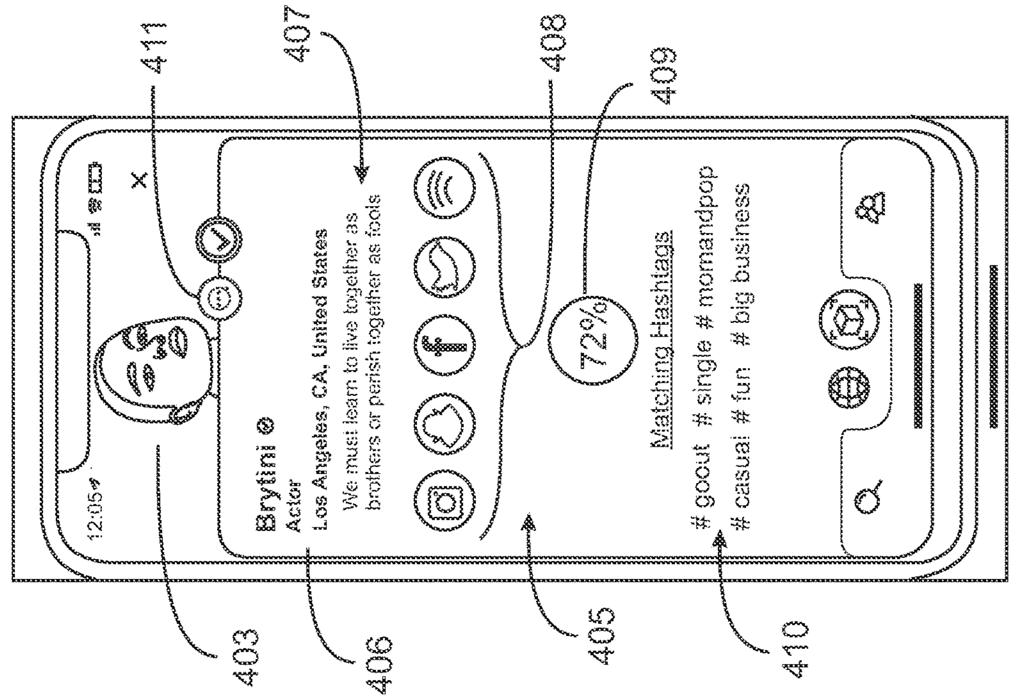
FIG. 4B illustrates the actual profile for the profile post of FIG. 4A.

Returning now to FIG. 2, profile post 212 is for a user Brytni. Wherever Brytni goes (qualified by privacy settings she chooses in configuration), her profile post may appear to other users who are active in the mobile application. A user selecting Brytni's profile post 212 will see interactive interface 401 returned by server 105 illustrated in FIG. 4A, which is analogous to profile post interface FIG. 3A for Aaron. Brytni's profile picture 403 is featured, and there is a connect link 402. Brytni's Dysko profile may be accessed by selecting icon 404, wherein the server returns display 405 in FIG. 4B.

Brytni's profile 405 has a portion of Brytni's photograph 403, and information 406, which discloses that she is an actor in LA. A favorite quote 407 is displayed as well as her favorite social media accounts 408. A post 409 tells the hashtag match between Brytni and the user accessing the profile as 72%. In addition, actual matching hashtags 410 are illustrated in this example. The skilled person will understand that the display and the information displayed may differ in location, design and content in different embodiments of the invention. A user can only see common hashtags, no others, thus a user can now keep their work and personal life in one account.

Figure 4A:
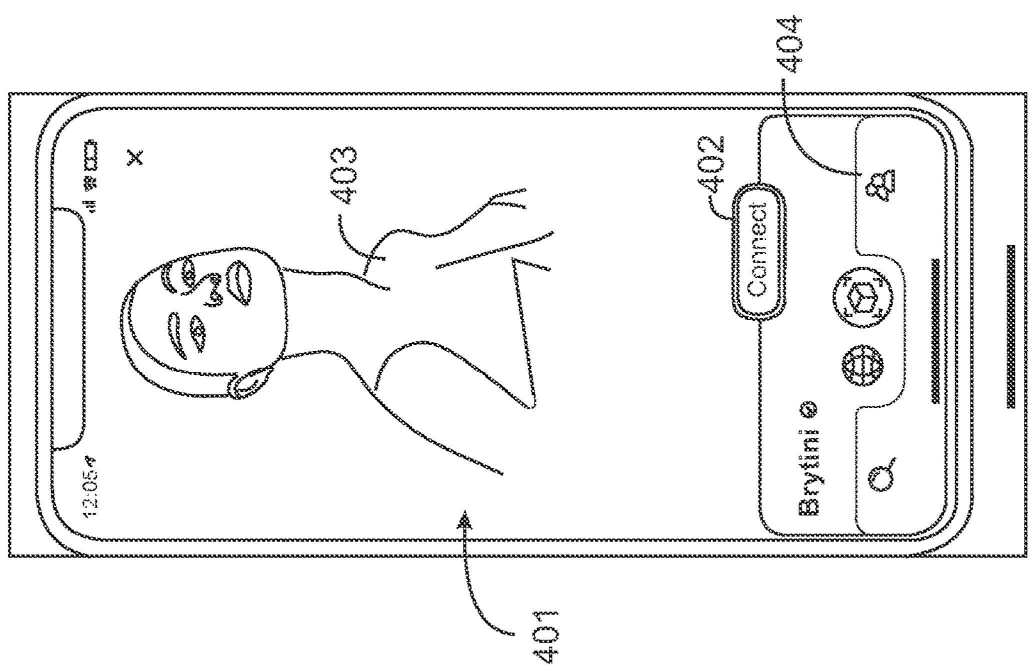
FIG. 4A illustrates another profile post for a user from FIG. 2.
Figure 5:
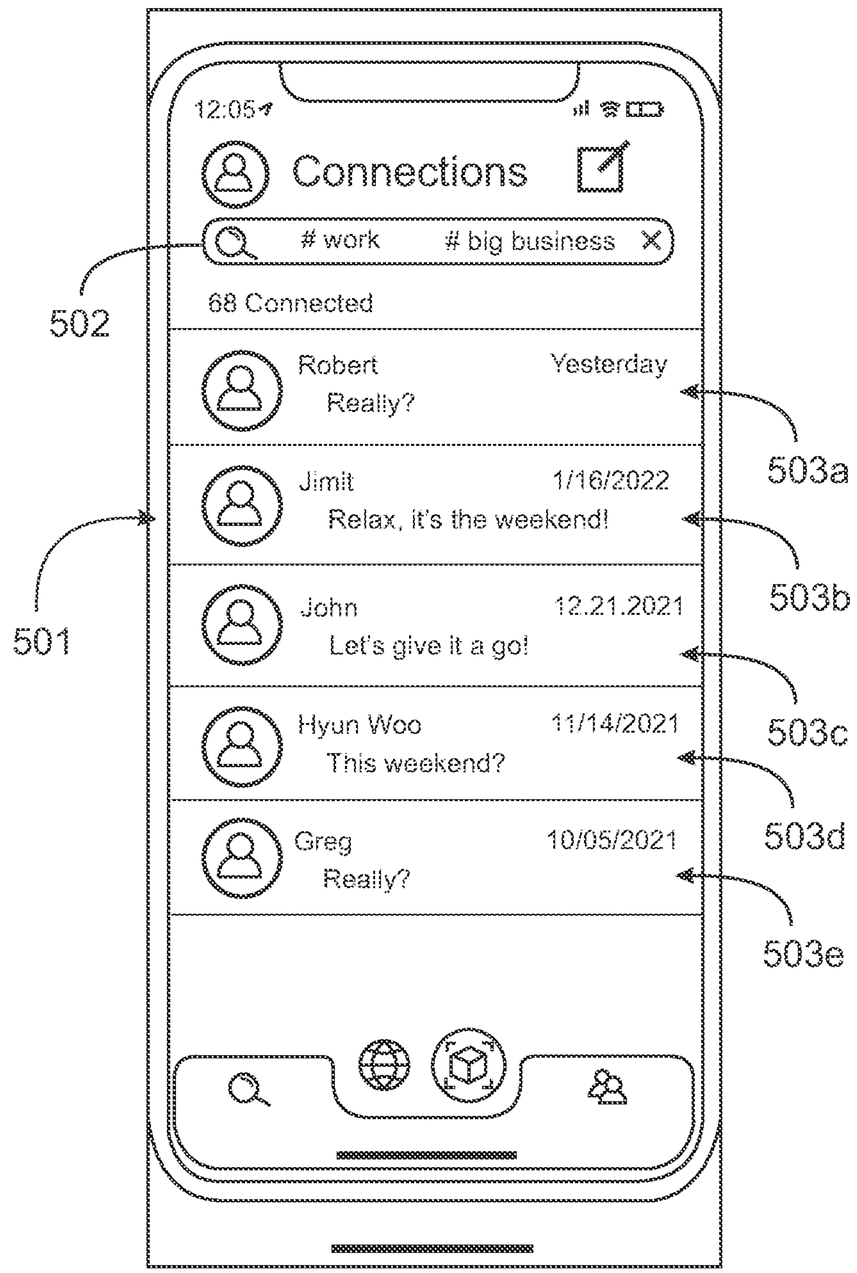
FIG. 5 illustrates a list of connections for a user in an embodiment of the invention.

FIG. 5 illustrates a display 501 returned after a user selects to connect to a user in that user's profile post (see Connect icon in FIG. 4A, for example). The user that gets a connection request may accept or decline. If the request is accepted, the accessing user's connections are then revealed by entering combinations of hashtags in a search field 502. In this example five previous connections 503*a* through 503*e* are illustrated along with the day of the connection. The picture icons in practice are actually photographs rather than the icons shown.

Figure 6:
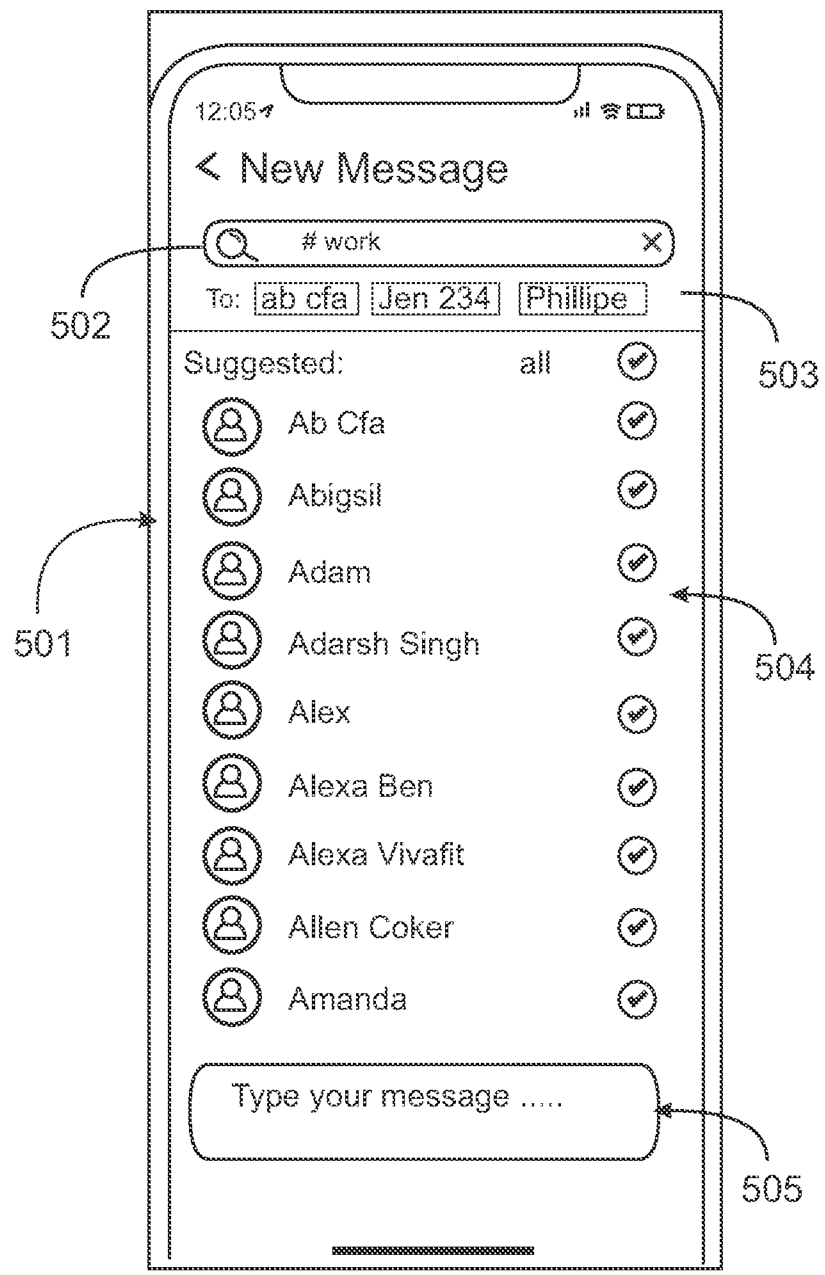
FIG. 6 illustrates a message initiation screen in an embodiment of the invention.

FIG. 6 shows a message initiation screen in which a user may compose just one message and send it as a separate message to all or any portion of matches (with no limit on the number). This "mass broadcast" messaging feature guarantees that every single one of a user's connections may hear from that user. Facebook/Instagram/Twitter's algorithm only allows for 10% of followers to see content posted. There is a search function 502 to search hashtags, and a scrolling list 503 to select recipients. A user may select all connections as recipients or select individually via a scrolling list 504. The message is entered in field 505.

Figure 7B:
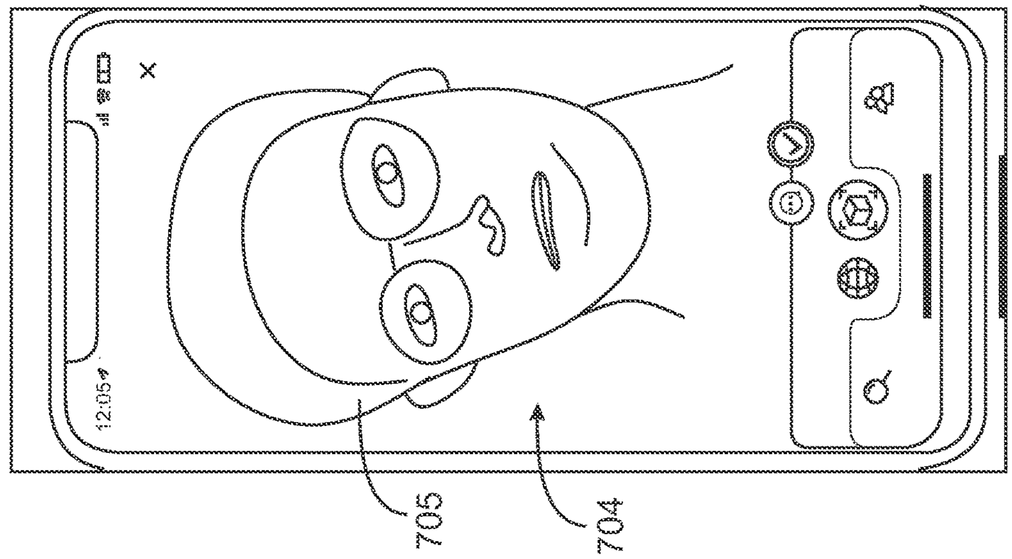
FIG. 7B is an enlarged display of the profile post of the user imaged in FIG. 7A.
Figure 7A:
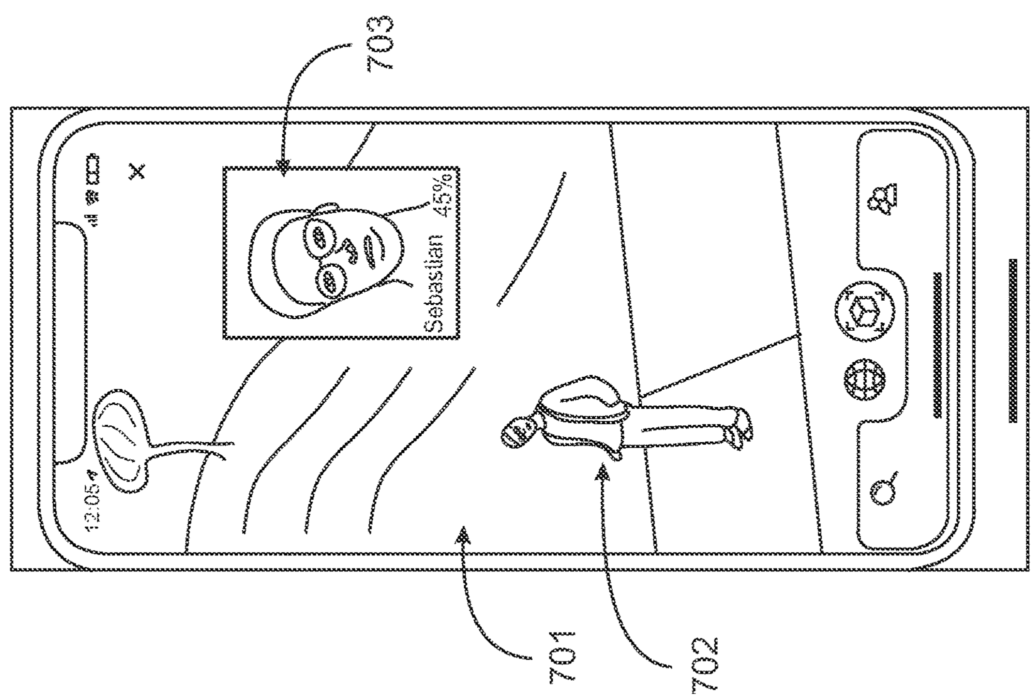
FIG. 7A illustrates an AR display on a user's platform, imaging another user.

FIG. 7A is a display back to a user employing the Dysko mobile app to image the user's son (Sebastian) 702 in AR display 701 via the user's smartphone's camera. In this example Sebastian's profile post 703 is overlaid in the AR display, as the server recognizes Sebastian in the image data transmitted via the user's phone and by GPS. Sebastian's profile post 703 shows the user is a 45% commonality with Sebastian, based on respective hashtags. The user may also touch Sebastian's profile post 703 and his security and privacy settings are accessible. FIG. 7B is an enlarged view of Sebastian's profile post from FIG. 7A.

Figures 8A, 8B:
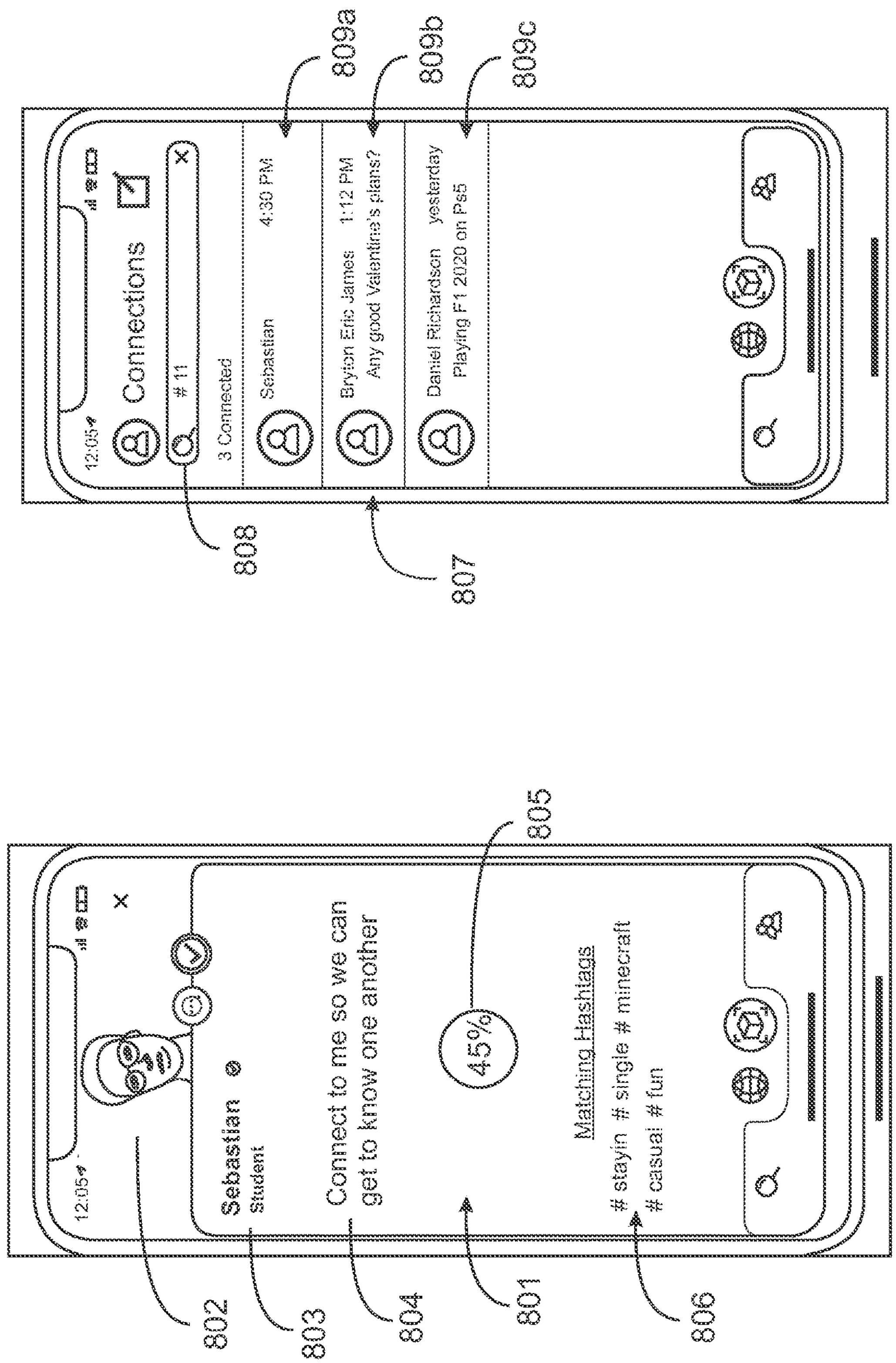
FIG. 8A illustrates the profile of the user imaged in FIG. 7A.
FIG. 8B illustrates a connection list for the user imaged in FIG. 7A.

FIG. 8A is a display 801 of Sebastian's profile with a partial picture 802 of Sebastian and information 803 entered by Sebastian in configuration, disclosing that Sebastian is a student. A social comment 804 is presented from Sebastian. A post 805 tells the hashtag match as 45% between Sebastian and the person accessing Sebastian's profile. Actual matching hashtags 806 are illustrated as well. FIG. 8B illustrates display 807 showing connections 809*a* through 809*c* for Sebastian.

Figure 9:
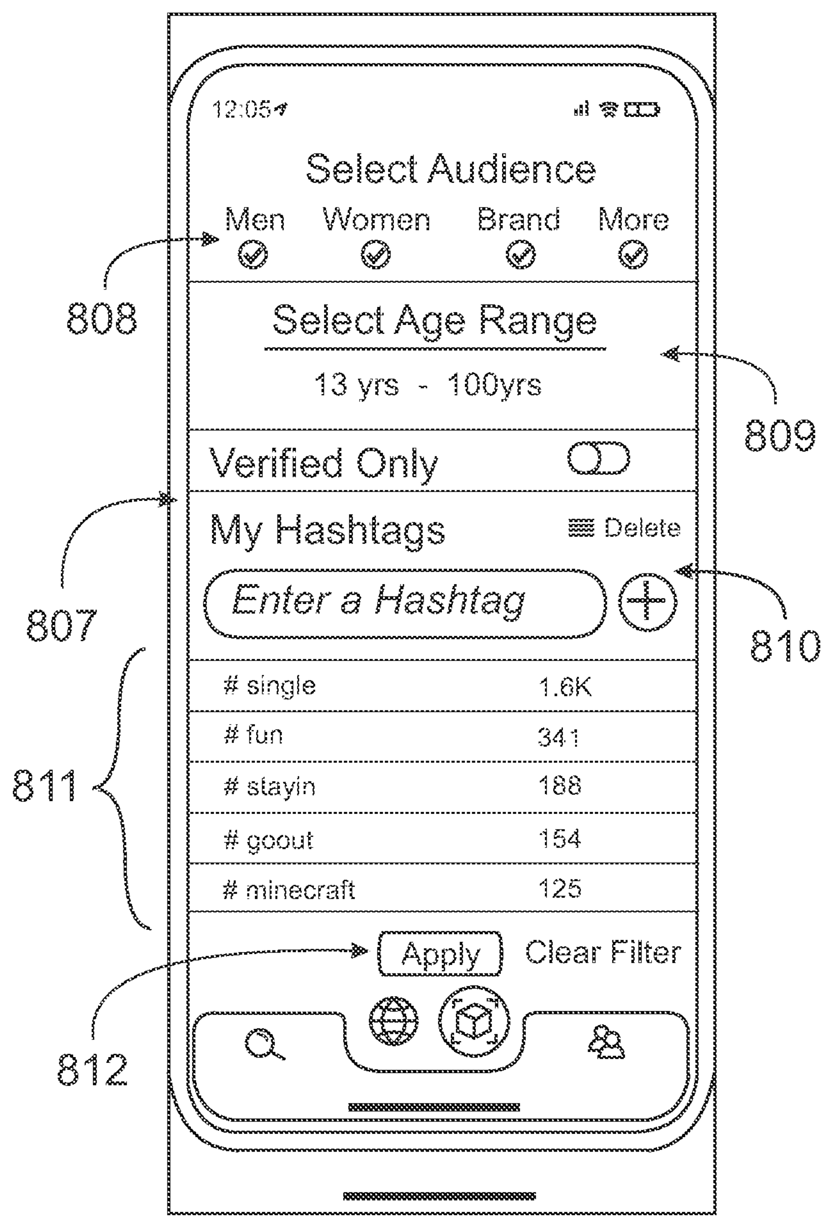
FIG. 9 illustrates a configuration screen enabling a user to filter whose profile posts may appear in an AR on that user's platform.

FIG. 9 is an interactive interface 807 in configuration wherewith a user may enter criteria to filter whose profile post may appear in a Dysko profile board for that user (see FIG. 2). In this interactive interface the user can specify at 808 criteria for an audience, such as Men, Women, Brands, and more. The user may make multiple selections and choosing "more" opens additional selections. At 809 the user can select an age range to filter whose profile posts may appear, and in this case the user has selected 13 years to 100 years of age.

At 810 the user may enter and edit the user's hashtags that will be used for matching with others. There is an entry field for entering a new hashtag, which clears for another by a Plus link. Five hashtags for this user are listed as list 811. This may be a scrolling list. Apply button 812 enables the user to update his or her configuration after making edits and additions.

In an alternative embodiment there may be icons posted with a profile board to quickly impose filters on the characteristics of profile posts that may appear. There may be an icon for example to see all users. Another may be to see only hashtag matches. Another may be to see only drop-ins. Another may be to see only in-person users.

The Dysko app associates the GPS location with individual profiles by storing locations for each user ID in a central database. An avatar image URL can be looked up for each user by ID. Avatar selection sets the associated avatar's user ID as a transaction target. The avatar has an associated user ID which the system API can resolve to GPS position. The Dysko app allows a user to toggle between users within ¼, ½ and 1 mile. With distances being unlimited thus allowing users to see profiles up to any distance away. These are not limitations in the scope of the invention, as they may change in other versions and embodiments.

In addition to functionality described above, the Dysko mobile application enables any user to enter a location, whether it is an address or a landmark and then, from a remote location, i.e. the comfort of their living room, backyard or the top of a volcano in Hawaii, that user can see, in augmented reality, profile posts (avatars) of real users at or near the location. The inventors term this function drop-in. The other user's profile posts appear, as described above, dependent on hashtag and other matches. What this accomplishes is to allow a convention in Las Vegas, for example, to be attended either in the flesh, or in augmented reality, providing the remote attendees have the ability to match #hashtags and then may communicate and network from anywhere in the world with the in-person attendees.

Dysko's technology enables a user to transport their AR profile to remotely drop in to any chosen location, even if they are not physically present. These drop-in users are visible in the app to all users who are physically present in that location and those users who are also just dropping in to that location. Users can drop in to any location around the world from any location around the world. Drop-in users are differentiated by a drop in icon, so other users may be aware.

The Dysko app and functionality at the server provides AR matching technology to allow Pop-Up AR conventions, gatherings, parties and meetings etc. to take place anywhere in the world, and to be attended by anyone with Dysko's AR matching technology according to embodiments of the present invention.

Another example may be such as Bank of America decides to hold a convention at the Great Pyramid of Giza, in Cairo, Egypt. People/shareholders etc. can then receive an access code and from anywhere in the world and virtually attend, meet, network and interact with other Dysko users who match, via hashtag matching, with them in augmented reality. Other examples might include "A school reunion under the Eiffel Tower." or even hosting your "Wedding in the garden of the palace of Versailles!"

The Dysko system provides for AR spaces the inventor terms AR rooms. The AR rooms may be analogous in some implementations to ZOOM' rooms. In this technology Swift™ and ARkit™ may be used for framework, WebSocket™ technology may be incorporated for real-time data transfer like chat room, comments and so forth. Posts may be created around the user in 3*d* space on top of the camera. The angle and the radius for the user for each post are calculated so they won't overlap. Web RTC™ or AVkit™ are incorporated in order to stream real time video and audio. If there are a large number of users in a room a product-related solution may be needed. For the server side and backend Phyton™ and Django™ may be used.

A user is provided interactive interfaces with input fields and links to create encrypted, secure AR spaces in embodiments of the invention. The AR spaces thus created are termed by the inventors Dysko Spaces. In one embodiment the spaces created may be open to other users by invitation only. The user chooses a name for the AR space and can host as many users as they want in that AR space. The user host chooses a time and date for the Dysko Space to occur and sends out an access code/link to each user to be invited.

Locations do not have to be relevant in Dysko Spaces. The Dysko Spaces can be virtually located and identified only by access code/link for security purposes. When a user receives an invitation, at the time and date of the event, the Dysko Space will open to invitees. Invitees enter the space by entering the access code into the mobile application, and they are immediately dropped into the AR Space, only accessible to users who have been invited to the same space. A user entering the space will have the space, AR entities, and profiles of other users displayed on his/her phone display.

If the Dysko Space is being created in tandem with an in-person event, invitees can be in person (physically at the event space) or drop ins, attending the event from the comfort of their home, dorm room, office, or wherever they may be. Icons in the display differentiate drop-ins from in-person attendees. Filter features allow all attendees to that Dysko Space to filter other attendees by those criteria and more. Users who drop in to a Dysko Space can access the video/audio feed of other users for a more immersive "live" experience.

Venues and institutions can place their Dysko Spaces in other different geographical locations allowing other users physically in those locations, or dropping in, to see, match and interact with other Dysko users inside that Dysko Space, using Google maps GPS. For example, Southern University wants to recruit students in Moscow, so Southern University creates an AR Dysko Space and places it in Moscow where they want via Google Maps, or another Mapping App, or alternatively, Dysko may provide their own mapping Application features. Then, users who are either physically at that specific location in Moscow in real-time, or users who are invited and dropping into the Moscow Dysko Space from anywhere in the world, can see in AR, and access in AR the Southern University Dysko Space, and mingle, match and interact in real time with the Dysko users inside.

In yet another embodiment of the invention a functionality the inventors term AR-YOU is enabled. This feature will enables users to evolve their Dysko profiles into fully customizable avatars which may be sent out on meeting and matching missions, and to report back to the enabling user. The user who customizes the user's avatar and sends the avatar on such a mission may go about the day while the user's avatar makes meaningful connections that otherwise would have been missed. Through interactive interfaces the user may enter a route and stopping points and locations, as well is times, for the Avatar. Using Goggle map routes, and GPS positioning, the user's AR profile will, at the appointed time move physically through real locations and other user's radius's along the set route. And during the route, the user's profile will make automated connection requests to other profiles that match in the desired way. At the end of a journey the information collected by the Avatar is made available to the user.

In yet another embodiment of the invention a function the inventors term Audio Visual Sharing is enabled. This embodiment may be termed as well Audio-Visual Adventures Through Augmented Reality (AVATAR).

In this circumstance a user, for example, who did not get a ticket to a Warriors game might drop into the space of the Warriors game and share the view of another user who is present at the game. The drop-in user may match with an in-person user at the game, and open a video call with the matched user, enabling the drop in user to actually see the game through the camera of the matched user's platform. In one embodiment the in-person user may have AR goggles or such as Google glasses or an equivalent device paired with his or her platform executing the Dysko app, The in-person user's goggles or glasses pairing with the user's platform running the mobile app, streams what the user sees via the goggles to the Dysko host. In this circumstance a drop-in user who interacts with the in-person user may request to receive the in-person viewer's video stream back from the host. The drop-in user may then see and hear what the in-person user sees and hears, in one circumstance the game the in-person user has paid to attend.

In one embodiment the drop-in user may pair his or her mobile platform in the home with a flat screen display, or with a smart TV and view and hear the game from the stream that originates with the in-person user's glasses or goggles.

In one embodiment a group of in-person users that are at the game, who are registered Dysko users having portable platforms executing the Dysko app, may enter an agreement to allow drop-ins to switch communication between individual ones of the attendees to get the different perspectives of the game. The in-person attendees may be seated at a variety of different places in the game venue. In an embodiment of the invention the in-person attendees in the cooperating group may have paid different prices for their seats, and the drop-ins who connect may be charged an agreed-to price for the privilege of connecting and viewing, and in-person users in the group may share proceeds charged for connecting. As an example, the total ticket price for the members of the in-person cooperating group may be $10, 000, and the group may collect $30,000 from a set of sixty drop-ins, creating a profit of $20,000 which may be shared on an agreed-to basis among members of the group.

In one embodiment a drop-in user may switch between in-person users at different games, and the in-person users at the different games may cooperate in a sharing agreement. In one circumstance an AR board may show drop-ins avatars floating above or proximate avatars of in-person users and the drop-in avatars may show an offer for connection, or the in-person avatar may show a price for connection. When the in-person avatar and the drop-in avatar reach a matched price, an interaction is enabled, allowing the drop-in user to connect and participate (audio visual) through the in-person avatars.

The skilled person will understand that this functionality is not limited to basketball games as used in the example above but may be practiced at any sort of sport venue, and any sort of human interaction, meeting or activity. A Dysko user may drop into any activity or presentation anywhere on the planet, or in the future off the planet as well, and participate sensibly, almost as if being at that place at that time in person, through matching and sharing with Dysko users who may be present.

In embodiments of the invention functions may be provided through the Internet-connected server to facilitate the practice of Audio Visual sharing in embodiments of the invention. User's and groups that will be in-person attendees at future human interactions, such as games and other presentations, may be enabled to advertise their offerings. Functionality my be provided for potential drop-ins to browse events that are scheduled, and there may also be functionality through interactive interfaces for users to interact and agree ahead of a time for an event.

In Audio-Visual Sharing fiscal transaction software of various sorts may be leveraged in the Dysko app to facilitate payments for agreed-to sharing, such that when an agreement is reached an agreed to amount of money may be transferred, or an agreed to amount by an agreed-to rate per unit time may be transferred between user's fiscal digital wallets.

In one embodiment of the invention regarding the implementation of Audio-Visual sharing the drop-in user to, for example, a sports venue will see in his or her AR board avatars of in-person users (present at the venue) positioned proximate (such as right above) the prospective users. The drop-in user may select the avatar and perspective of the in-person user in the audience. Better seats can demand higher prices from drop-ins and the potential drop-in can select the avatar he can afford to drop in on.

The skilled person will understand that the illustrations and descriptions herein are entirely exemplary and are not limiting to the scope of the invention. The scope is limited only by the claims.

The invention claimed is:

1. An audio-visual sharing system, comprising:

a first mobile platform associated specifically with a first user, the first mobile platform having a first imaging apparatus, a first audio microphone and speaker, and first GPS circuitry, executing a mobile application, and coupled to an Internet network streaming an Augmented Reality (AR) display to the first user's mobile platform;

a second mobile platform associated specifically with a second user, the second mobile platform having a second imaging apparatus, a second audio microphone and speaker, and second GPS circuitry, executing the mobile application, and coupled to the Internet network streaming the AR display to the second user's mobile platform;

an Internet-connected server having a processor executing coded instructions, and coupled to a data repository;

a first profile for the first user stored in the data repository; and a second profile for the second user stored in the data repository;

characterized in that the first user is present at an event location bounded by GPS coordinates with the first user's mobile platform executing the mobile application and capturing, by a platform's image and microphone devices audio and video of proximate activity, the captured audio and video streamed via the Internet to the Internet-connected server, and in that the second user is not present at the event location, but both the first and second mobile platforms receive an AR board display comprising a first avatar representing the first user as an in-person user present at the event and a second avatar representing the second user as a drop-in user not present at the event;

wherein the second user is enabled by functions of a mobile app to interact with a first user's avatar to request permission to receive the captured audio and video streamed to the Internet-connected server, and the first user is enabled to grant or deny the request, and if granted, the Internet-connected server streams the audio and video to the second user's mobile platform.

2. The audio-visual sharing system of claim 1 further comprising a head-mounted imaging device in use by the first user and paired to the first mobile platform, wherein the audio and video is captured by the head-mounted imaging device paired to the first mobile platform, and the first mobile platform streams the audio video to the Internet-connected server.

3. The audio-visual sharing system of claim 1 wherein the first and the second user are enabled in the AR display to communicate to negotiate streaming of the audio and video to the second user's mobile platform.

4. The audio-visual sharing system of claim 1 wherein a plurality of users present at the event capture and stream audio and video to the Internet-connected server, and the plurality of users cooperate as a unit such that the second user may negotiate from one of the plurality to selectively receive audio and video streamed by individual ones of the plurality of users present at the event.

5. The audio-visual sharing system of claim 3 wherein negotiation of permission to receive the audio video stream comprises agreeing on a price to be paid by the second user to the first user.

6. The audio-visual sharing system of claim 5 wherein the first and the second user's profiles comprise transaction software enabling payment by one user to another.

7. The audio-visual sharing system of claim 1 further comprising functionality enabling registered users to advertise upcoming events on interactive interfaces and to transact between users for purchasing audio video streams of activity at events.

8. The audio-visual sharing system of claim 1 wherein the second user's mobile platform is paired with a flat-screen display and the audio video stream is presented through the flat screen display.

9. The audio-visual sharing system of claim 8 wherein the flat screen display is a smart television.

* * * * *